United States Patent [19]

Hodges et al.

[11] Patent Number: 5,078,822
[45] Date of Patent: Jan. 7, 1992

[54] METHOD FOR MAKING REFRACTORY LINED DUCT AND DUCT FORMED THEREBY

[76] Inventors: Michael F. Hodges, 952 Liberty La.; Hugh H. Storms, 3990-11 Batton St., NW., both of North Canton, Ohio 44720; Victor M. Davis, 4215 Powell St., Parkersburg, W. Va. 26101

[21] Appl. No.: 436,416

[22] Filed: Nov. 14, 1989

[51] Int. Cl.$^5$ .............................................. B29C 63/26
[52] U.S. Cl. ..................................... 156/294; 264/269
[58] Field of Search ................. 156/293, 294; 264/30, 264/58, 87, 267, 269; 428/34.5, 34.6, 36.91

[56] References Cited

U.S. PATENT DOCUMENTS

| | | | |
|---|---|---|---|
| 2,534,652 | 12/1950 | Allison et al. | 264/269 |
| 2,839,825 | 6/1958 | Edwards et al. | 264/30 |
| 2,949,704 | 8/1960 | Jacobs | 264/30 |
| 3,878,034 | 4/1975 | Bever et al. | 428/34.5 |
| 4,024,007 | 5/1977 | Jago et al. | 156/293 |
| 4,865,673 | 9/1989 | Shishkin et al. | 156/294 |
| 4,984,769 | 1/1991 | Bruckner et al. | 264/30 |

FOREIGN PATENT DOCUMENTS 0290798  11/1988  European Pat. Off. ............ 156/294

Primary Examiner—Michael W. Ball
Assistant Examiner—Steven D. Maki
Attorney, Agent, or Firm—Robert E. Stebens

[57] ABSTRACT

A refractory lined duct is provided having sheet metal tube lined with a ceramic fiber matrix bonded with binder material forming a tubular refractory liner of predetermined thickness and thermal characteristics. This duct has the refractory liner held in fixed, retained relationship with the tube solely by frictional forces and adhesive bonding by the binder material. A method for making of this duct is provided and includes the steps of vacuum-forming of an elongated refractory sleeve or tube from a slurry of ceramic fibers and binder materials onto a tubular forming die, inserting the sleeve while in a hydrated state into a sheet metal supporting tube of complemental shape and size such that adjacent surfaces of the tube and sleeve will be in contacting engagement and then drying the assembly to remove the water resulting in forming of a hard, solid structure refractory liner that is fixed in the tube solely through frictional forces and adhesive bonding by the binder materials. A modified duct formed by the same methods includes a composite refractory liner formed from a plurality of tubular liners that each have their own respective structural, physical and thermal characteristics.

3 Claims, 2 Drawing Sheets

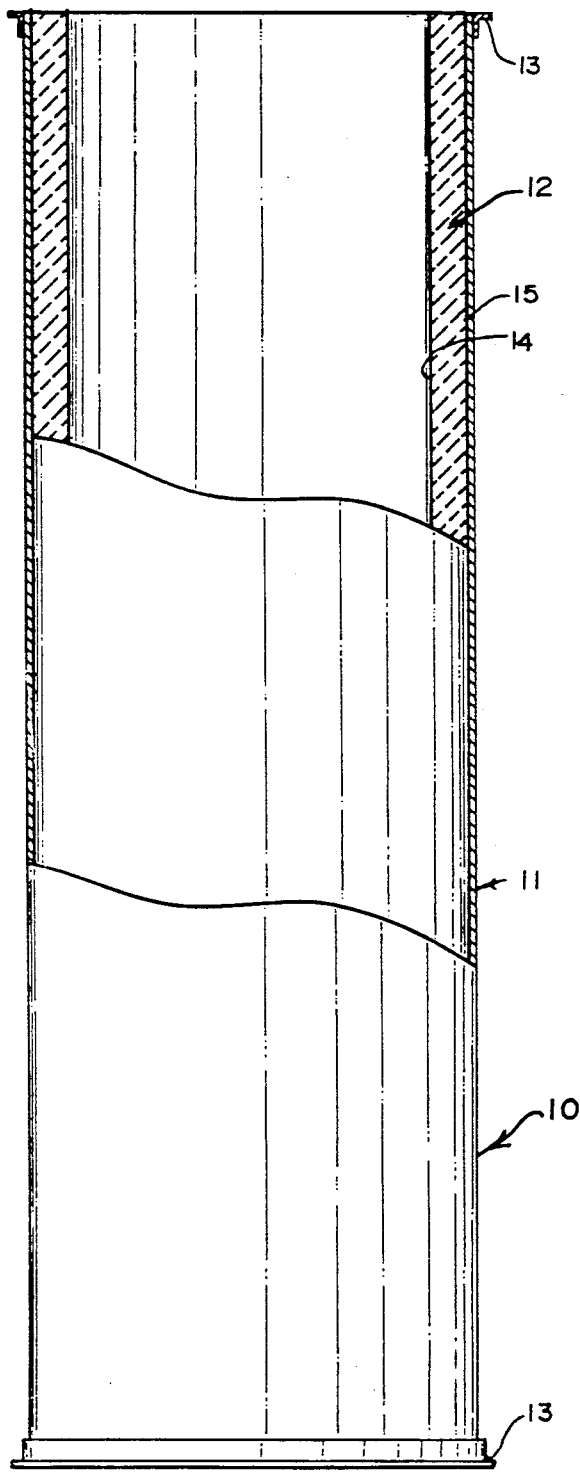
FIG. 1
FIG. 2

METHOD FOR MAKING REFRACTORY LINED DUCT AND DUCT FORMED THEREBY

FIELD OF THE INVENTION

This invention relates in general to ducts or conduits formed with a refractory liner. It relates more particularly to ducts or conduits having a ceramic fiber liner functioning as a refractory to accommodate the corrosive and abrasive characteristics of hot gaseous fluids designed to be routed through such conduits. It further relates in particular to a method for making of a duct having a refractory liner of ceramic fiber.

BACKGROUND OF THE INVENTION

In many industrial applications it is necessary that conduits or ducts be provided for interconnection of various types of apparatus which require the routing of hot gaseous fluids of many types from one component to another. In most of these environments, the hot gaseous fluids exhibit not only corrosive characteristics which will adversely affect conventional metallic conduits, but are also caused to flow at relatively high velocities. The relatively high gas flow velocity frequently encountered results in further adverse effects of either frictional wearing and erosion of the interior of metallic ducts or other types of duct work including but not limited to the increased likelihood of chemical corrosion. The relatively high temperatures also have a substantial adverse effect on the metal conduit such as decreasing structural strength and presenting a safety hazard to workers who may need to be in close proximity.

One technique heretofore utilized to meet the requirements of this highly adverse operational environment has been to line metallic or steel ducts with a castable refractory material. A disadvantage of the ducts having the castable refractory liner is that such refractories are not thermally efficient and as a consequence, the metal ducts which are lined with such materials must be made so as to develop greater structural strength to support the weight of the castable refractory that is required in most cases to meet the operational requirements.

There has also been an attempt to form ducts capable of withstanding the operational requirements of transmission of hot gaseous fluids through lining of metal conduits with a soft ceramic fiber material. The soft ceramic fiber material, as its name implies, does not exhibit the desired resistance characteristics to erosion through the relatively high gas velocities that are encountered. In an effort to meet the erosion effect, there have been attempts to also coat the interior surface of these liners with a layer of suitable material to attempt to rigidify the interior surface layers. These attempts have also not proven to be sufficiently successful as the rigidifying surface material will eventually crack and peel off and expose soft ceramic fibers to the point where the liners will erode and eventually become unusable, thus requiring replacement.

Another disadvantage of either the castable refractory liners or the soft ceramic fiber lining is the technique of obtaining the attachment or positioning of the liner within the metal conduit. The usual techniques require first securing of anchors to the interior of the metal duct. The refractory material is then either mechanically secured or it is formed directly onto those anchors such as by spraying or molding. Similarly, the soft ceramic fiber linings have been applied to the interior of the metal conduits by use of anchors which are first secured to the interior of the metal conduit.

Another attempt to meet the problems has been the formation of a vacuum cast sleeve or liner which is then subsequently assembled with a metal duct. This technique is not particularly advantageous in that it requires assembly at the operational site where the duct will be utilized. This technique increases the cost of installation.

SUMMARY OF THE INVENTION

In accordance with this invention, a method is provided for making of refractory lined ducts wherein a ceramic fiber sleeve is positioned in and retained within a metal tube without utilization of mechanical attachment anchors. In accordance with this invention, a duct capable of handling gaseous fluids of relatively high temperatures and also having corrosive properties is fabricated by first forming of a ceramic fiber sleeve and, while the sleeve is in a wet or hydrated state, positioning the sleeve within the metal tube and thereafter subjecting the assembly to a drying operation to remove moisture from the ceramic fiber sleeve. This method results in the sleeve and metal tube being mechanically and adhesively secured together into assembled relationship.

The ceramic sleeve is formed by well-known operations for vacuum-forming of such articles through placement and forming of the ceramic fibers onto an elongated forming die. The ceramic fibers are formed in a layer on the die to form an elongated, tubular sleeve having an outside diameter that is at least equal to, if not slightly larger than the interior diameter of the metal tube into which the sleeve is to be placed. While in a wet condition, the die-supported sleeve is inserted into the metal tube and the die is either removed at a point in time where the ceramic fiber sleeve is partially inserted within the tube or when it is fully inserted. After the die is removed from the ceramic fiber sleeve, the assembled metal tube and ceramic sleeve are placed in an oven wherein the elevated temperature of the oven and airflow is sufficient to effect evaporation of the water from the ceramic fiber sleeve. The temperatures and drying times are dependent upon the particular characteristics of the sleeve as to its physical size and moisture content.

The ceramic fiber sleeve is of a dimension such that when it has been dried, it will mechanically engage with the interior surface of the metal tube and be at least partially retained therein through frictional force resisting relative axial displacement. Additionally, securing of the sleeve to the metal tube is effected through adhesive bonding action of binders that are included in the mixture forming of the ceramic fiber sleeve.

In accordance with another aspect of this invention, a conduit assembly having multiple ceramic fiber liners is provided through sequential formation and insertion of two or more ceramic fiber sleeves into the tube. This aspect of the invention enables a ceramic fiber sleeve adapted to lower temperature applications to be first placed within the conduit and then a second ceramic fiber sleeve adapted for higher temperature applications inserted and secured in a similar manner.

These and other objects and advantages of this invention will be readily apparent from the following detailed description of the illustrative embodiments and the accompanying drawings.

DESCRIPTION OF THE DRAWING FIGURES

FIG. 1 is an elevational view of a duct formed in accordance with the method of this invention with portions of the elements removed for clarity of illustration.

FIG. 2 is an elevational view of a ceramic fiber sleeve formed by a vacuum process onto a die.

Figure 4:
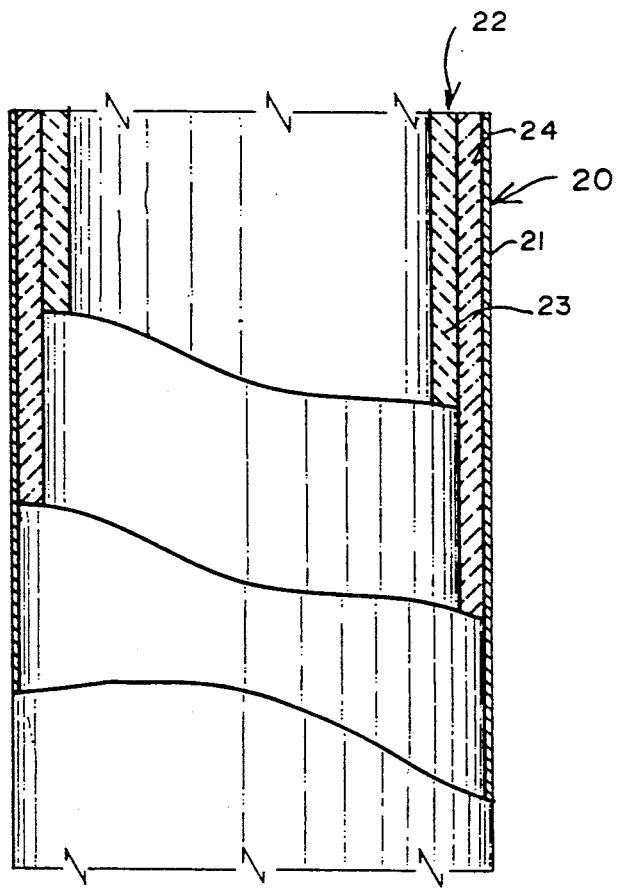
FIG. 4 is an elevational view of a section of conduit formed in accordance with the method of this invention and having multiple refractory liners.

DESCRIPTION OF THE ILLUSTRATIVE EMBODIMENT AND METHOD OF FORMING OF THE INVENTION

Referring to FIG. 1, a refractory lined duct 10 embodying this invention and formed in accordance with the method is shown with portions broken away for clarity of illustration. The duct 10 includes a structurally supporting tube 11 and a refractory liner 12. The tube 11 is formed from a suitable material for the particular installation and may most commonly be formed of sheet steel. The size of the duct 10 is also dependent upon the particular installation for which the duct is designed as is the diameter. As an example, duct embodying this invention may have a nominal diameter in the range of 30 or 36 inches with the liner itself having a thickness of the order of 3 inches. Duct of this type frequently is required in installations where there are large volumes of gaseous materials that must be transported from one location to another, and accordingly, large size ducts are preferred to reduce the volicities while maintaining sufficient capacity to handle the volume of gas.

The supporting tube 11 which is indicated to be fabricated of sheet steel may be of a type that is formed by spiral winding techniques of elongated strips of steel with the adjacent edges being mechanically interlocked. FIG. 1 does not illustrate specifics of detail of the structure of the tube 11 as that does not form a part of the invention and is dependent upon a particular design. However, the tubes 11 are generally provided with end flanges 13 which provide a means for mechanically interconnecting a number of such ducts in serial alignment. These flanges are generally drilled to accommodate fastening bolts. Again, the technique of interconnecting adjacent duct in end-to-end relationship is a matter of mechanical design and is of a type selected to be appropriate for a particular installation and the details are not a part of this invention.

In accordance with this invention, the refractory liner 12 is retained in position within the interior of the supporting tube 11 through a combination of frictional forces and adhesive bonding as between the contacting wall surfaces of the liner and the tube. As can be seen in FIG. 1, the liner 12 has an inner wall surface 14 which is termed "The Hot Face" and an outer wall surface 15 which is termed "The Cold Face". One of the functions of the refractory liner 12 is to provide thermal insulation and thus has a characteristically low thermal conductivity such that the cold face will not exceed predetermined temperatures for a particular application. This is advantageous to reduce the mechanical stresses that must be accommodated by the supporting tube 11 as well as enhancing safety in the environment as it concerns workers who must operate the processing installation in which such duct may be installed.

In accordance with this invention, the refractory liner 12 is formed from ceramic fibers which are held in a matrix by suitable binders. The ceramic fibers that are particularly useful for a refractory liner of this type and for high temperature installations comprises a combination of alumina-silica fibers and aluminum oxide fibers. These fibers which are of small cross-sectional shape are held in a matrix by means of binders which may include combinations of colloidal silica binders and cationic starch binders. These materials are mixed in a slurry composition which, through a vacuumforming process, can be fabricated into a tubular shape such as the illustrative refractory liner. The specific materials, their proportions in the composition, are known in the art and the specifics are not deemed of importance to the invention other than to note that the materials are selected in accordance with known techniques to form a refractory which will have the desired thermal and structural characteristics. Vacuum-forming of a tubular liner such as that which is illustrated is conventionally accomplished by vacuum-forming techniques with the ceramic fibers and binder being collected on an elongated tubular die. This forming technique is diagrammatically illustrated in FIG. 2 where an elongated die 16 is shown with a quantity of the ceramic fibers and binder collected on its exterior and thus forming an elongated tube. In the initial forming stages, the ceramic fiber and binder matrix is in a highly hydrated state, although it will be sufficiently compacted with the binder material functioning to adhesively secure the fibers in a structurally self-supporting shape. The refractory liner at this stage can be handled and moved for performance of other operations to complete its fabrication. Such tubular refractories are utilized in other applications than that of the invention and, for such purposes, the article subsequent to the initial vacuum-forming operation is subjected to a drying operation such as by placing the article in an oven and circulating air for evaporation of the moisture which is predominantly water. The article as thus formed in accordance with prior art practices is a structurally solid article that can be mechanically placed and secured in specific installations.

However, in accordance with the method of invention for forming the duct embodying this invention, the tubular refractory liner 12 while in a wet hydrated state is first positioned within the interior of the supporting tube 11 prior to being subjected to a drying operation. Depending upon the state or degree of hydration of the liner, it may be advantageous to dry the liner to an extent where it will have adequate structural integrity to enable its assembly with the tube. To form a duct 10 embodying this invention, the refractory liner 12 is formed with an exterior diameter that is at least equal to or advantageously slightly larger than the inside diameter of the supporting tube 11. For example, in the case of a supporting tube 11 having a diameter in the range of 30 to 36 inches, the exterior diameter of the liner 12 as fabricated by the vacuum-forming process may be one-fourth inch larger to better assure that there will be a mechanical engagement as between the liner and tube to result in the desired frictional forces for retaining the liner within the tube. Assembly of a vacuum-formed liner with the tube 11 is diagrammatically illustrated in FIG. 3. While the refractory liner 12 is in a hydrated state and still retained on the forming die 16, it can be easily lifted and slid axially into the upper open end of the tube 11. The tube 11 would be supported on a transporting plate or other carrier device and the liner 12 as it slides down into the tube 11 will also come to rest on that supporting plate. As the liner 12 is slid into the tube, excess refractory material may be skinned or shaved off from the exterior surfaces or realigned onto the surface forming a continuous contacting surface engagement with the interior of the supporting tube 11. A refractory liner in a hydrated state does not have a smooth surface as the material has a tendency to flow to a certain degree and this is illustrated in FIG. 2 by the rough surface conformation. When the liner is at lest partially inserted within the tube, the forming die 16 may be removed. This may be accomplished by mechanical rotation of the die which will break the surfaces loose and enable the die to be withdrawn. Once the die has been withdrawn, the hydrated liner will continue sliding down into the tube until it comes to rest on the bottom supporting plate.

Once the hydrated liner is fully positioned with in the tube, the assembly may then be subjected to a drying procedure. This drying procedure follows that previously described in connection with forming of refractory articles of a more conventional nature. Such a procedure as indicated comprises placing the article into an oven which is at a sufficiently elevated temperature as to cause evaporation of the water. Air is circulated around the articles to aid in removal of the water vapor and thereby hasten the drying process. A drying apparatus is not shown as such is well-known in he art as is the operating techniques as to temperature and airflow. The operation does continue until the water is evaporated at which time the refractory material is fully solidified. This process also completes forming of the interfit of the liner to the interior of the tube to result in generation of frictional forces which prevent the removal of the liner from the supporting tube. Additionally, the binder materials which are functioning to secure the ceramic fibers in a matrix also serve to adhesively secure the liner to the interior of the supporting tube. Thus, in accordance with this invention, a duct 10 having a refractory liner is provided which does not require the use of any other mechanical means for securing the refractory liner with in the interior of the tube.

A modified duct 20 also fabricated in accordance with the method of this invention and thus embodying the advantageous structural arrangement is shown in FIG. 4. This duct also includes a structurally supporting tube 21 and a refractory liner designated generally by the numeral 22. However, in this modification, the liner 22 comprises a plurality of tubular refractory liners with two ceramic fiber liners 23 and 24 shown and which are disposed in coaxial relationship to each other and to the supporting tube 21. Utilizing two liners 23 and 24 to form a composite refractory liner 22 permits each of the liners to be fabricated from different combinations of materials. By appropriately proportioning the types of ceramic fibers that are selected and the binder materials, it is possible for a liner of predetermined thickness to be formed having different physical and thermal characteristics. One objective of this is that the inner liner 23 of such a composite structure may advantageously be formed from ceramic fiber materials and binders such that it will have relatively less thermal shrinkage at high temperatures. The second liner 24 may then be formed from the ceramic fiber materials and binders with the resulting liner having a characteristically higher shrinkage at high temperatures. This dual liner construction thus permits a lower fabricating cost as the inner liner having a relatively lower thermal shrinkage is relatively more expensive as compared to the outer liner. Other factors may also be considered in a combination of two liners to achieve particular physical and thermal objectives.

Figure 3:
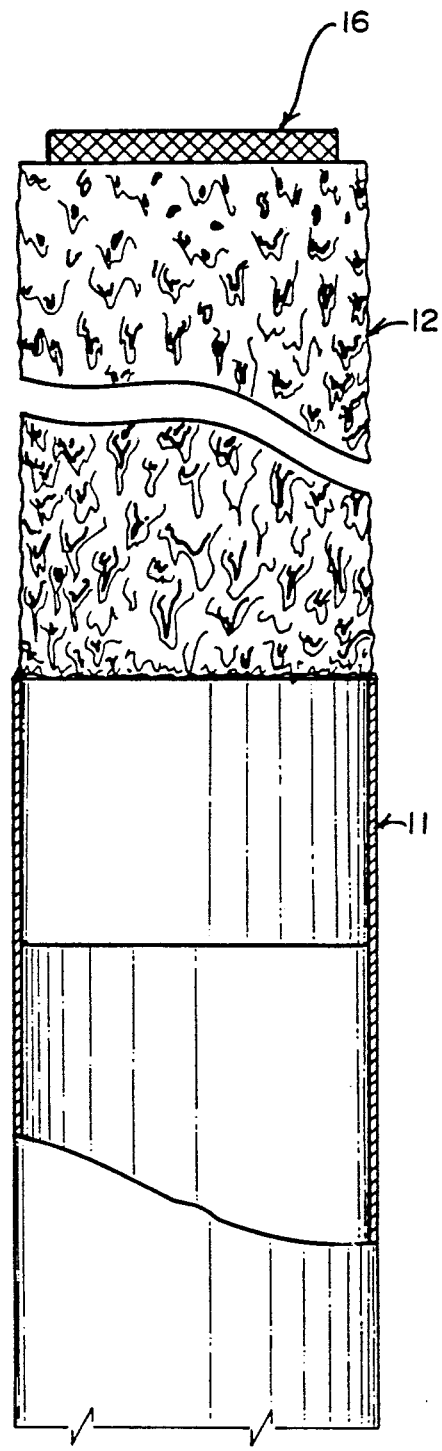
FIG. 3 is a diagrammatic illustration of the process of assembly of the ceramic sleeve in a wet form into a metal tube.

Assembly of the dual liners 23 and 24 with the supporting tube may be effected in substantially the same manner as described with respect to the assembly shown in FIG. 3. A first liner 24 is placed within the supporting tube 21 with its die then being removed. A second or innermost liner 23 may then be similarly placed within the outer liner in the same manner and its respective forming die then removed. The assembled liners and supporting tube may then be subjected to an appropriate drying procedure to remove the water. With the water being removed, the two liners then maintain their respective coaxial aligned positions through frictional forces as well as adhesive bonding from the binders as is the assembly retained within the supporting tube.

It will be understood that the dimensions given for the illustrative duct are for purposes of example and that the duct may be fabricated in any desired size and configuration. It will also be understood that the illustrative dimensional thickness of the refractory liner is also for purposes of example and its thickness may be varied upon the particular installation in which the duct will be placed. Also, the specific ceramic fiber materials and binders will be selected on the basis of the structural and thermal characteristics desired for the particular duct.

It will be readily apparent that a novel and particularly advantageous refractory duct is provided by this invention. It will also be readily apparent that the method of its fabrication results in economy of assembly and produces a unitary structure wherein the refractory liner and supporting tube are retained in mechanical interengagement.

Having thus described this invention, what is claimed is:

1. The method of making refractory lined ducts having an elongated, structurally supporting tube and a refractory liner carried on an interior, axially extending wall of the tube comprising
   1) forming an elongated, tubular refractory sleeve of ceramic fiber and binder materials on an elongated, structurally supportive die in a hydrated state by vacuum-forming wherein said sleeve having has an external, axially extending wall of a configuration that is geometrically and dimensionally complemental to the interior, axially extending wall of the supporting tube to form an interference fit therewith effective in mechanically retaining said sleeve and tube in fixed interengagement;
   2) inserting the sleeve, while in a hydrated state and on the die, coaxially into the supporting tube and after insertion, removing the die from the sleeve; and
   3) drying the sleeve while said sleeve is maintained in fixed position within the supporting tube to remove substantially all liquid resulting in solidification of the sleeve in frictionally retained and adhesively bonded relationship with the supporting tube.

2. The method of claim 1 which includes partial drying of the sleeve to obtain sufficient structural integrity facilitate its insertion in the tube.

3. The method of claim 1 which includes
a) forming of a second elongated, tubular refractory sleeve of ceramic fiber and binder materials selected to have respective physical or thermal characteristics different from those of the first mentioned sleeve on an elongated, structurally supportive die in a hydrated state by vacuum-forming said second sleeve formed with an external, axially extending wall of a configuration that is geometrically and dimensionally complemental to the interior, axially extending wall of the first mentioned sleeve to form an interference fit therewith effective in mechanically retaining said sleeves in fixed interengagement;
b) inserting the second sleeve while in a hydrated state coaxially within the first sleeve while it is in a hydrated state and after insertion, removing the die from the second sleeve; and
c) concurrently drying both the first and second sleeves while they are maintained in fixed position with respect to each other to remove substantially all liquid resulting in solidification of the sleeves in frictionally retained and adhesively bonded relationship to each other.

* * * * *